United States Patent [19]
Willyoung

[11] 3,821,573
[45] June 28, 1974

[54] MULTISET POLYPHASE WINDING
[75] Inventor: David M. Willyoung, Scotia, N.Y.
[73] Assignee: General Electric Company, Schenectady, N.Y.
[22] Filed: Jan. 26, 1973
[21] Appl. No.: 326,851

[52] U.S. Cl. .............................................. 310/198
[51] Int. Cl. .......................................... H02k 23/26
[58] Field of Search .......... 310/179, 180, 184, 198, 310/200–208

[56] References Cited
UNITED STATES PATENTS

| | | | |
|---|---|---|---|
| 2,630,541 | 3/1953 | McElligott | 310/198 |
| 3,201,627 | 8/1965 | Harrington | 310/198 |
| 3,324,322 | 6/1967 | Johns | 310/198 |
| 3,470,407 | 9/1969 | Richer | 310/198 |
| 3,476,964 | 11/1969 | Willyoung | 310/198 |
| 3,600,619 | 8/1971 | Tiarks | 310/206 |
| 3,622,823 | 11/1971 | Broadway | 310/179 |
| 3,652,888 | 3/1972 | Harrington | 310/198 |
| 3,673,477 | 6/1972 | Broadway | 310/202 |

Primary Examiner—R. Skudy
Attorney, Agent, or Firm—John F. Ahern; James W. Mitchell

[57] ABSTRACT

A multiset polyphase winding for a dynamoelectric machine having overlapping phase belts and providing a phase angle displacement between polyphase sets, accomplished by separating adjacent coil sides of one polyphase set by at least two stator slots and interspersing the coil sides of the remaining polyphase sets therebetween. For example, a single winding comprising two balanced three-phase sets would have 12, 60° phase belts with each phase belt of one three-phase set overlapping two phase belts of the other three-phase set by 30 electrical degrees as a result of the coil sides of one three-phase set occupying alternate slots with the coil sides of the other three-phase set.

17 Claims, 4 Drawing Figures

PATENTED JUN 28 1974 3,821,573

MULTISET POLYPHASE WINDING

BACKGROUND OF THE INVENTION

1. Field of the Invention

This invention relates to a winding for a dynamoelectric machine; and more particularly, to a multiset polyphase winding having overlapping phase belts providing electrical phase angle displacement between sets.

2. Description of Prior Art

Dynamoelectric machines having multiset polyphase windings are well known in the art. An example is a six-phase generator winding having two independent sets of three-phase windings, such as is described in U.S. Pat. No. RE19,433. One advantage of a six-phase generator is that one polyphase set may deliver power independently of the other set. If one polyphase winding set becomes disabled, the generator is able to supply power through the operative winding set without totally disrupting electrical service.

The electrical power from two polyphase winding sets of a six-phase generator may be combined into conventional three-phase power. This combination can be effected by a number of methods, but the complexity and cost of the methods involved relate to the electrical phase angle between the polyphase sets. For instance, if the electrical phase angle is zero, the corresponding phases of both polyphase sets may be directly connected together without use of special equipment. If the electrical phase angle is not zero, phase shifting equipment must be employed.

The prior art has recognized that the cost of phase shifting equipment can be minimized if the electrical phase angle between the three-phase sets is 30°. Under this condition transformers may be used to combine the two three-phase outputs into conventional three-phase power. An explanation of the desirability of 30 electrical degree phase angle between sets for converting six-phase power into three-phase power by means of transformers is found in "Stator Winding Systems with Reduced Vibratory Forces for Large Turbine Generators," a paper authored by C. H. Holley and D. M. Wilyoung and presented at the IEEE Winter Power meeting in January, 1970.

Windings are composed of electrical conductors placed in stator slots and electrically connected in specific arrangements. A top layer conductor and a bottom layer conductor occupy one stator slot, and a coil is formed by connecting a top layer conductor to a bottom layer conductor displaced a whole or fractional pole pitch from the top layer conductor. Phase belts are formed by connecting a number of coils, and each electrical phase of each polyphase set comprises series or parallel-connected coils from at least two phase belts. Phase belts are described in terms of widths which are measured in electrical degrees.

Six-phase generator windings having phase angle displacements of 0 and 30 electrical degrees between the two three-phase sets are known in the prior art. Six-phase generator windings having 12 phase belts per pole pair with each phase belt being 30 electrical degrees wide are exemplified by U.S. Pat. Nos. 2,731,576 and 3,601,642, both assigned to the assignee of the present invention. These patents employ adjacent and non-overlapping phase belts. The coils of each phase belt occupy adjacent slots in the stator. This arrangement inherently provides a phase angle displacement of 30 electrical degrees between the two three-phase sets. U.S. Pat. No. RE19,433, an example of a six-phase generator winding having phase belts, of 60° ± one electrical slot angle, provides a phase angle displacement of zero degrees between both three-phase sets. The conductors of each phase belt occupy every other or alternate slots, and a special series phase belt end connection arrangement is required to provide the zero phase angle displacement between the three-phase sets. This special end connection restricts the use of this winding arrangement to applications where the voltage permits the series connection of the opposite phase belts in a phase.

Alternating current produced by an electrical generator contains harmonic components which are multiples of the fundamental frequency of the current. Harmonics are undesirable and various methods have been devised to eliminate or significantly reduce these components, particularly in conventional three-phase generators. In a six-phase generator having phase belts of 30° widths, the harmonic content of the alternating current generated by one three-phase set when the other is inoperative is greater than the harmonic content of the alternating current generated by a conventional three-phase generator having 60° phase belts. Increased harmonics result from the 30° phase belts, while the 60° phase belts are beneficial in reducing harmonics. Increased harmonics cause undesirable heating of the internal components of the generator making serious damage to the machine probable if only one three-phase set of a six-phase generator having 30° phase belts is operative while the other polyphase set is inoperative.

The present invention overcomes the deficiencies of the prior art by employing, in its preferred embodiment, a six-phase generator winding forming two three-phase sets, one three-phase set having a phase angle displacement from the other three-phase set of 30 electrical degrees, each three-phase set having 60° phase belts, and the coils of each phase belt occupying alternate slots and providing a 30° overlap of two phase belts of the other three-phase set. The 30° phase angle between the two three-phase sets allows use of conventional transformers to convert the six-phase power into three-phase power. The 60° phase belts are employed to reduce harmonics, thereby allowing each three-phase set to be operative independently of the other three-phase set without overheating the internal components of the generator. The coils of each phase belt occupying alternate slots yield a simple and economical end connection scheme which permits either the series or parallel connection of opposite phase belts of a phase, while providing the 30° phase angle displacement between the two three-phase sets. For the largest generators, voltage requirements favor the use of the parallel connection, an option not available in a generator built according to the aforementioned U.S. Pat. No. RE19,433 system.

SUMMARY OF THE INVENTION

It is an object of this invention to provide a multiset polyphase winding for a dynamoelectric machine having phase belts 60 electrical degrees wide and with each phase belt overlapping the corresponding phase belts of each remaining set by an electrical angle related to the number of winding sets.

It is another object of this invention to provide a winding for a dynamoelectric machine having two balanced three-phase sets having a phase angle displacement which provides for economical combination of six-phase power into three-phase power.

It is another object of this invention to provide a six-phase winding for a generator in which the harmonic content of the current generated is small.

It is still another object of this invention to provide a winding for a six-phase generator arranged to allow independent operation of only one three-phase winding set without detrimental effect on the internal components of the generator.

To achieve these and other objects, the preferred embodiment of the invention is a six-phase generator winding having 12 phase belts each 60° wide, the phase belts being arranged in two balanced three-phase sets phase displaced by 30 electrical degrees, each phase belt of one three-phase set overlapping two phase belts of the other three-phase set by 30°, and the conductors of each phase belt occupying alternate sets of slots.

BRIEF DESCRIPTION OF THE DRAWINGS

A more complete understanding of the invention may be had by referring to the accompanying detailed description and drawings in which.

DETAILED DESCRIPTION OF THE INVENTION

Figure 1:
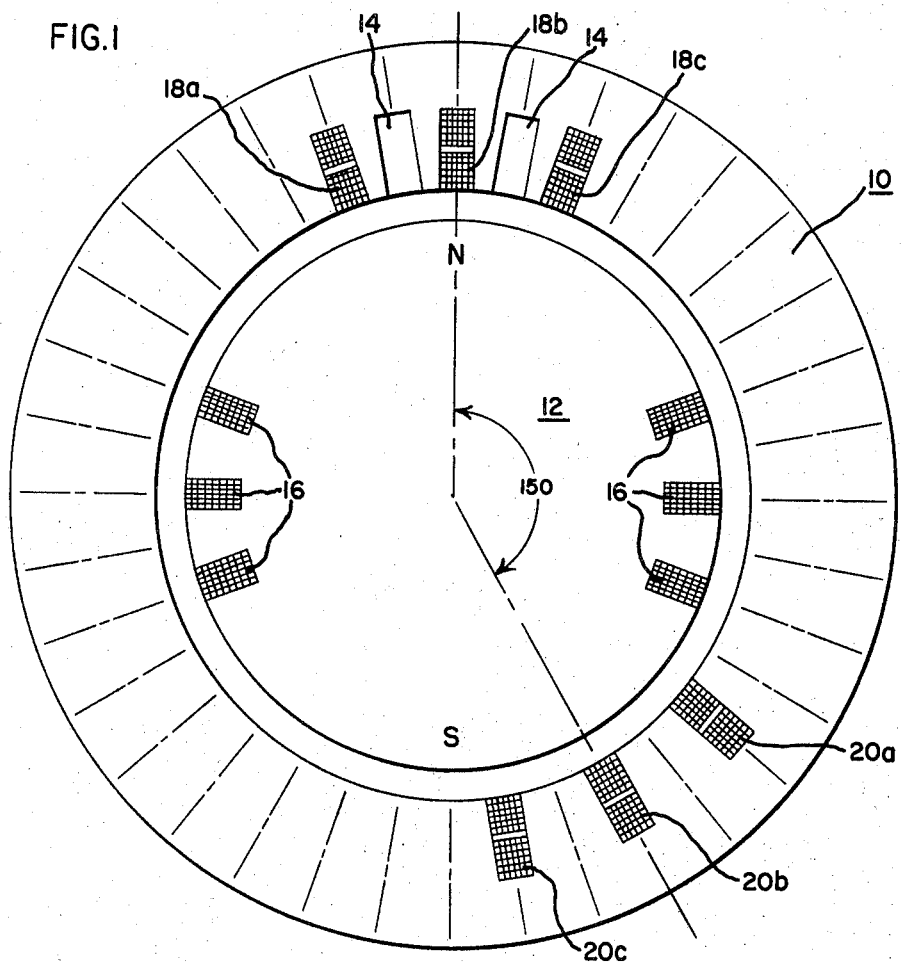
FIG. 1 is a sectional end view of a dynamoelectric machine illustrating the fundamental elements of the winding of the present invention.

The fundamental elements common to a dynamoelectric machine or generator are shown in FIG. 1, including a stator 10 and a rotor 12. The stator 10 includes a plurality of slots; a few of the slots are illustratively referenced at 14 and the center lines, disposed at equal angles around the stator, indicate the position of additional slots similar to those at 14. The rotor 12 is indicated as having one pole pair, i.e., one pair of magnetic poles referenced N and S indicating, respectively, a north pole and a south pole. The rotor may include any number of pole pairs. The pole pairs may be induced by permanent magnets or by a rotor winding producing a magnetic field or by a combination of both. A rotor winding including conductors 16 occupying slots in the rotor exemplifies a rotor winding for producing the N-S pole pair indicated.

An armature winding formed by conductors or coil sides is received in the slots 14 of the stator 10. Each stator slot contains a top layer coil side and a bottom layer coil side. Top layer coil sides, a few illustratively shown at 18a, 18b, and 18c, occupy positions in the slots closest the rotor, and the bottom layer coil sides, a few illustratively shown at 20a, 20b, and 20c, occupy positions in the slots farthest removed from the rotor. Each top layer coil side is connected to a bottom layer coil side displaced by a full or fractional pole pitch from the top layer coil side to form a coil. The pole pitch is a measurement of the relationship of the top and bottom coil sides of a coil relative to the pole pairs of the rotor. For example, the coils formed by connecting coil sides 18a and 20a, 18b and 20b, and 18c and 20c have 5/6 pitch because the top and bottom coil sides are displaced by five-sixths of 180 electrical degrees or 150 electrical degrees.

The coils thus formed may be connected in series or parallel or in combinations of both to form phase belts. A typical phase belt is exemplified by the coils formed by connecting coil sides 18a and 20a, 18b and 20b, and 18c and 20c. Each electrical phase of an armature winding is formed by two phase belts per pole pair which may be connected in series or parallel. The two phase belts for each pole pair of an electrical phase are disposed in the stator slots with the top layer coil sides directly opposite a magnetic pole at the same point in the rotor rotation. The top layer coil sides 18a, 18b, 18c of the previously described phase belt are directly opposite the N magnetic pole of the rotor 12, and a second phase belt (not shown) directly opposite the S magnetic pole would be used to form one electrical phase. Thus, two phase belts per phase per pole pair describes this arrangement.

A number of electrical phases may be connected to form a polyphase winding set. The most typical and well-known polyphase winding set is a balanced three-phase set, which has three electrical phases separated from one another by a phase angle of 120 electrical degrees. Further, a plurality of polyphase winding sets, known as multiset polyphase windings, may be employed in a single dynamoelectric machine.

Figure 2:
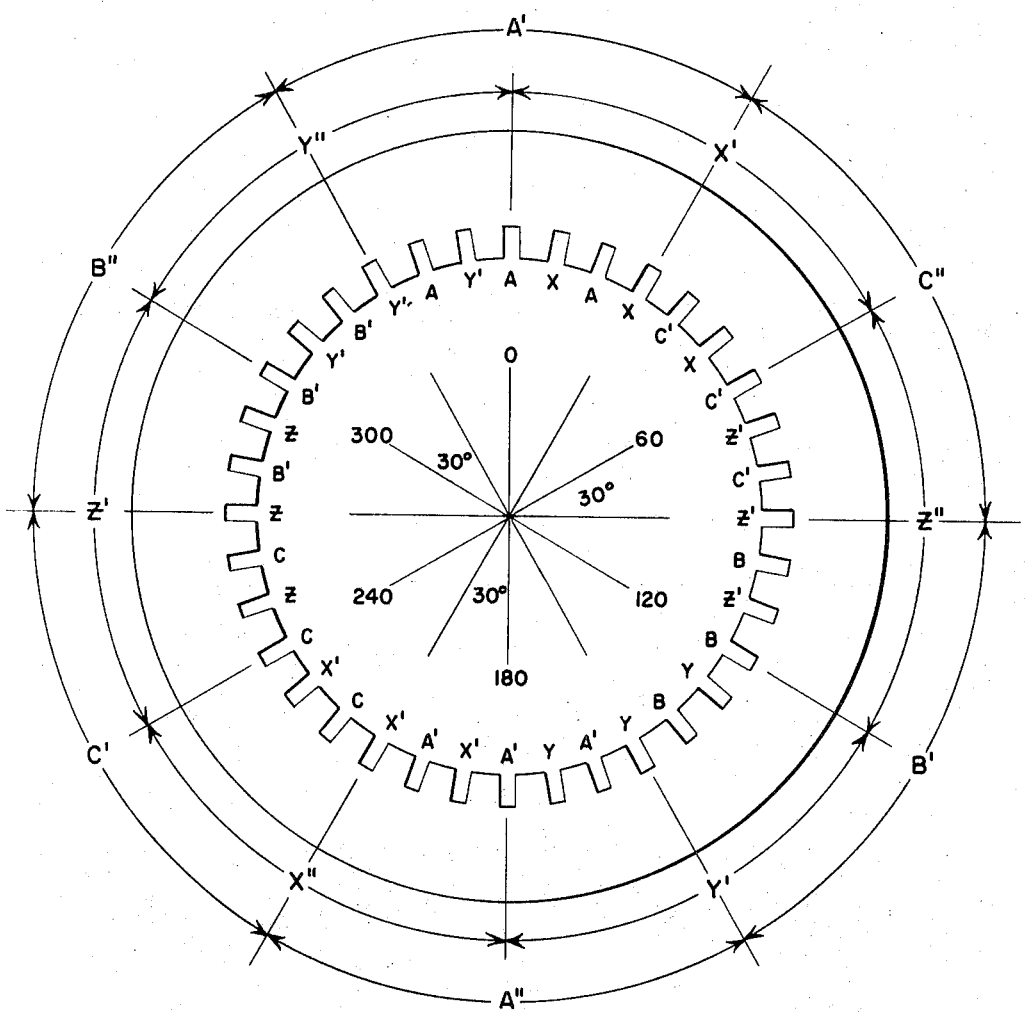
FIG. 2 is a sectional end view of a portion of the dynamoelectric machine illustrated in FIG. 1, further showing a complete embodiment of one form of the winding of the present invention.

The matters previously discussed are old in the art, and are intended to serve as background for understanding the present invention. The present invention comtemplates a multiset polyphase winding for a dynamoelectric machine composed of overlapping phase belts and having corresponding phases of each polyphase set displaced from one another by a predetermined electrical phase angle. A preferred embodiment of the invention illustrating this concept is shown in FIG. 2. As there illustrated adjacent the stator slots are the top layer coil sides of a winding having two sets of balanced three-phase windings for use in a six-phase generator having one pole pair and a 36 slot stator. One balanced three-phase set includes phases A, B, and C while the other balanced three-phase set includes phases S, Y, and Z. The two phase belts forming one phase of a polyphase set are designated by a primed and a double-primed alphabetical letter; for example, A' and A'' form phase A of the ABC three-phase set. The primed and double-primed alphabetical letters indicate the two phase belts per phase per pole pair.

The adjacent coil sides of each three-phase set occupy alternate slots with the adjacent coil sides of the other three-phase set. The adjacent coil sides of one three-phase set are separated by one slot, leaving the intermediate slots for receiving the coil sides of the other three-phase set. This is exemplified in FIG. 2 where one top layer coil side of the ABC three-phase set is intermediate two top layer coil sides of the XYZ three-phase set, and vice versa. However, in a more general sense, if more than two polyphase sets are incorporated in a multiset polyphase winding, the adjacent coil sides are separated by a number of slots equal to one less than the number of polyphase winding sets. For example, if three polyphase sets were employed, adjacent coil sides of one three-phase set would be separated by two slots, leaving the two intermediate slots to receive the coil sides from the remaining two three-phase sets.

Separating adjacent coil sides by at least one slot requires that the corresponding phases of the polyphase winding sets be displaced in phase from one another when the diametrally opposite, identical phase belts per pole pair are series or parallel connected.

Figure 3:
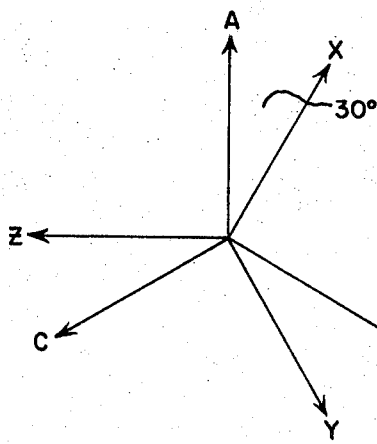
FIG. 3 is a vector diagram representing a 30° phase angle displacement between the two balanced three-phase sets.

FIG. 3 illustrates the phase angle displacement of the corresponding phases of the two balanced three-phase winding sets described in FIG. 2. Phases A, B and C constitute one balanced 3 phase set while phases X, Y and Z comprise the other. Due to the fixed 120° relationship of each phase in a particular three-phase set, the phases of one three-phase set are displaced by the same phase angle from the corresponding phases of the other three-phase set.

In FIG. 3 a path traced in a circle around the phases represented by vectors will sequentially encounter a phase of one three-phase set and then a phase of the other three-phase set. In other words, the phase order rotational sequence alternates for two three-phase winding sets having corresponding phases displaced in phase. This alternating phase order rotational sequence dictates the order in which the coil sides are placed in the stator slots. In FIG. 2 if a rotational path around the stator slots is considered, the coil sides forming the ABC set and the XYZ set are encountered in alternating sequence in consecutive slots, which is the same alternating sequence illustrated by FIG. 3.

Extrapolating this principle to a multiset winding embodying more than two polyphase sets, the adjacent coil sides of each polyphase set will be separated by a number of slots one less than the number of polyphase sets. The conductors occupying consecutive slots will be in the same order as the phase order rotational sequence. For example, if a winding included four sets of polyphase windings with the winding sets being displaced in phase such that the phase order rotational sequence indicated that the first, second, third, and fourth sets were encountered in order, adjacent coil sides of each particular three-phase set would be separated by three slots, and the coil sides would occupy consecutive slots in the order of first, second, third, fourth, first, second, third, fourth, et seq.

Referring again to the windings shown in FIG. 2, each phase belt is 60° wide and each phase belt of one three-phase set overlaps two phase belts of the other three-phase set by 30°. The width of each phase belt is indicated concentrically external to the periphery of the stator. The phase belts of the ABC and XYZ three-phase sets are 60° wide, and the ABC phase belts and the XYZ phase belts overlap by 30°. This relationship is more clearly illustrated in FIG. 4 where the phase belts of FIG. 2 are shown in developed form, and the 60° width of each phase belt and the 30° overlap of the phase belts can readily be observed.

The winding illustrated in FIG. 2 inherently provides a 30 electrical degree phase angle displacement between the two three-phase sets. The phase angle results primarily from the coil pitch and the number of stator slots, as the following explanation indicates. If the coil pitch is uniform, meaning that each coil has the same pitch, the current generated in each coil will have an electrical phase angle related to the position of the coil in the stator. Because the coils form the phase belts, the phase belts dictate the phase angle between the three-phase sets. In order to secure the 30 electrical degree phase angle between the two three-phase sets, an odd integral number of coils must occupy a 30 electrical degree stator band. An odd number of coils requires an odd integral number of stator slots. In other words, the angle between slots, known as the electrical slot angle, $\theta_{SLOT}$ must conform to the formula $\theta_{SLOT} (2n+1) = 30°$, where $n = 0, 1, 2, 3, ---$. The electrical slot angle is related to the number of stator slots, $N_S$, and the number of rotor poles, $N_P$, and is expressed by the formula $\theta_{SLOT} = 360/N_S \times N_P/2$. Substitution produces the following formula for the number of stator slots that must be used to achieve the 30 electrical degree phase angle between two three-phase sets: $N_S = 6N_P (2n+1)$, where $n = 0, 1, 2, 3 ---$. Since a rotor pole pair, $N_{PP}$, must equal one-half the number of rotor poles (two rotor poles comprise one pole pair) or $N_P = 2N_{PP}$, substitution produces $N_S = 12N_{PP}(2n+1)$, where $n=0, 1, 2, 3 ---$. Thus, the number of stator slots equals 12 times the number of pole pairs times $(2n+1)$, where $n=0, 1, 2, 3 ---$.

Using the above formula, characteristics which are particularly advantageous for large turbine generators have been determined as follows:

| Rotor Pole Pairs | Stator Slots |
| --- | --- |
| 1 | 36 |
| 1 | 60 |
| 1 | 84 |
| 2 | 72 |
| 3 | 108 |

Figure 4:
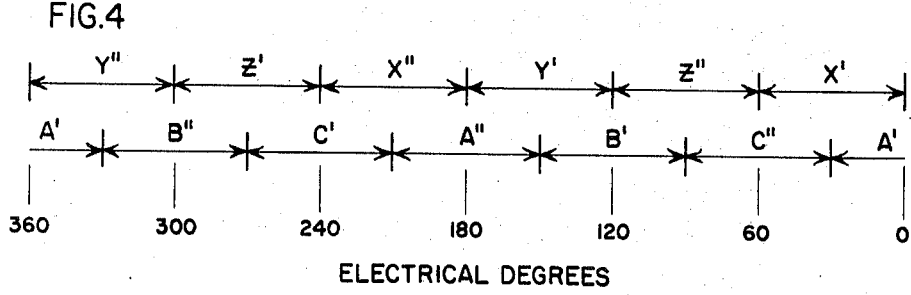
FIG. 4 illustrates the winding in FIG. 2 in developed form.

In summary and in consideration of the winding illustrated in FIGS. 2 and 4, it can be seen that each three-phase set, due to its 60 electrical degree width phase belt, operates essentially as an independent three-phase set just as in a conventional three-phase generator. Construction in this manner allows use of the technology relating to 60° phase belts to eliminate harmonics. This allows operation of one three-phase set in the six-phase generator independently of the other three-phase set without detrimental effect on the generator and without inducing large harmonic contents in the current generated.

Although a specific embodiment of the invention has been shown and described, those skilled in the art are aware of the well-known methods of varying the generalized dynamoelectric machine and winding design considerations previously described to produce a variety of modifications. For example, it is well known that a four-pole generator having 72 slots may be entirely equivalent in design considerations to a two-pole 36 slot generator. In fact, the art discloses well-known methods for providing such equivalences and for reducing dynamoelectric machine design considerations into generalized forms. Therefore, it is intended by the appended claims to cover all such modifications and changes as fall within the true spirit and scope of the invention.

What is claimed as new and desired to be secured by Letters Patent of the United States is:

1. In a dynamoelectric machine including a stator element having a plurality of slots for receiving a winding and further including a rotor element having at least one pole pair, a multiset polyphase winding comprising:

a plurality of coil sides electrically connected to form two phase belts per phase per pole pair in each of at least two polyphase sets;

adjacent coil sides of each particular polyphase set being separated by a number of slots equal to one less than the number of polyphase sets;

the coil sides forming the polyphase sets occupying consecutive slots in phase order rotational sequence; and the corresponding phases of each polyphase set being displaced in phase from one another.

2. The multiset polyphase winding as recited in claim 1 wherein each polyphase set is a balanced three-phase winding.

3. The multiset polyphase winding as recited in claim 2 wherein the number of polyphase sets is two.

4. The multiset polyphase winding as recited in claim 3 wherein the two three-phase sets are displaced in phase from one another by 30 electrical degrees.

5. The multiset polyphase winding as recited in claim 3 wherein each phase belt is substantially 60 electrical degrees in width.

6. The multiset polyphase winding as recited in claim 5 wherein each phase belt of one three-phase set overlaps each of two phase belts of the other three-phase set by 30 electrical degrees.

7. The multiset polyphase winding as recited in claim 6 wherein a plurality of the phase belts comprising a phase are parallel-connected.

8. In a six-phase generator having two balanced three-phase winding sets, the generator including a stator element having a plurality of slots for receiving the winding and further including a rotor element having at least one pole pair, an armature winding comprising:

a plurality of coil sides electrically connected in coils of uniform pitch to form two phase belts per phase per pole pair in each three-phase set;

the coil sides of one three-phase set occupying alternate slots with the coil sides of the other three-phase set;

each phase belt having a width of substantially 60 electrical degrees;

each phase belt of one three-phase set overlapping two phase belts of the other three-phase set by 30 electrical degrees; and the two three-phase sets being displaced in phase from one another by 30 electrical degrees.

9. The armature winding as recited in claim 8 wherein the pitch of each coil is five-sixths.

10. A six-phase electrical generator, comprising:

a stator element having a plurality of slots for receiving a winding;

a rotor element having at least one pole pair and being rotatably mounted within the stator element; and a winding disposed within the slots of the stator element, an armature winding having two balanced three-phase winding sets comprising:

a plurality of coil sides electrically connected in coils of uniform pitch to form two phase belts per phase per pole pair in each three-phase set;

the coil sides of one three-phase set occupying alternate slots with the coil sides of the other three-phase set;

each phase belt having a width of substantially 60 electrical degrees;

each phase belt of one three-phase set overlapping each of two phase belts of the other three-phase set by 30 electrical degrees; and the two three-phase sets being displaced in phase from one another by 30 electrical degrees.

11. The generator as recited in claim 10 wherein the pitch of each coil is five-sixths.

12. The generator as recited in claim 10 wherein the number of stator slots receiving the armature winding equals 12 times the number of pole pairs times $(2n+1)$, where $n=0, 1, 2, 3, ---$.

13. The generator as recited in claim 12 wherein:
the stator element has 36 slots; and the rotor element has one pole pair.

14. The generator as recited in claim 12 wherein:
the stator element has 60 slots; and the rotor element has one pole pair.

15. The generator as recited in claim 12 wherein:
the stator element has 84 slots; and the rotor element has one pole pair.

16. The generator as recited in claim 12 wherein:
the stator element has 72 slots; and the rotor element has two pole pairs.

17. The generator as recited in claim 12 wherein:
the stator element has 108 slots; and the rotor element has three pole pairs.

* * * * *